No. 877,099. PATENTED JAN. 21, 1908.
L. LEYERLE.
CAR LIFTING AND REPLACING DEVICE.
APPLICATION FILED AUG. 20, 1906.
2 SHEETS—SHEET 1.
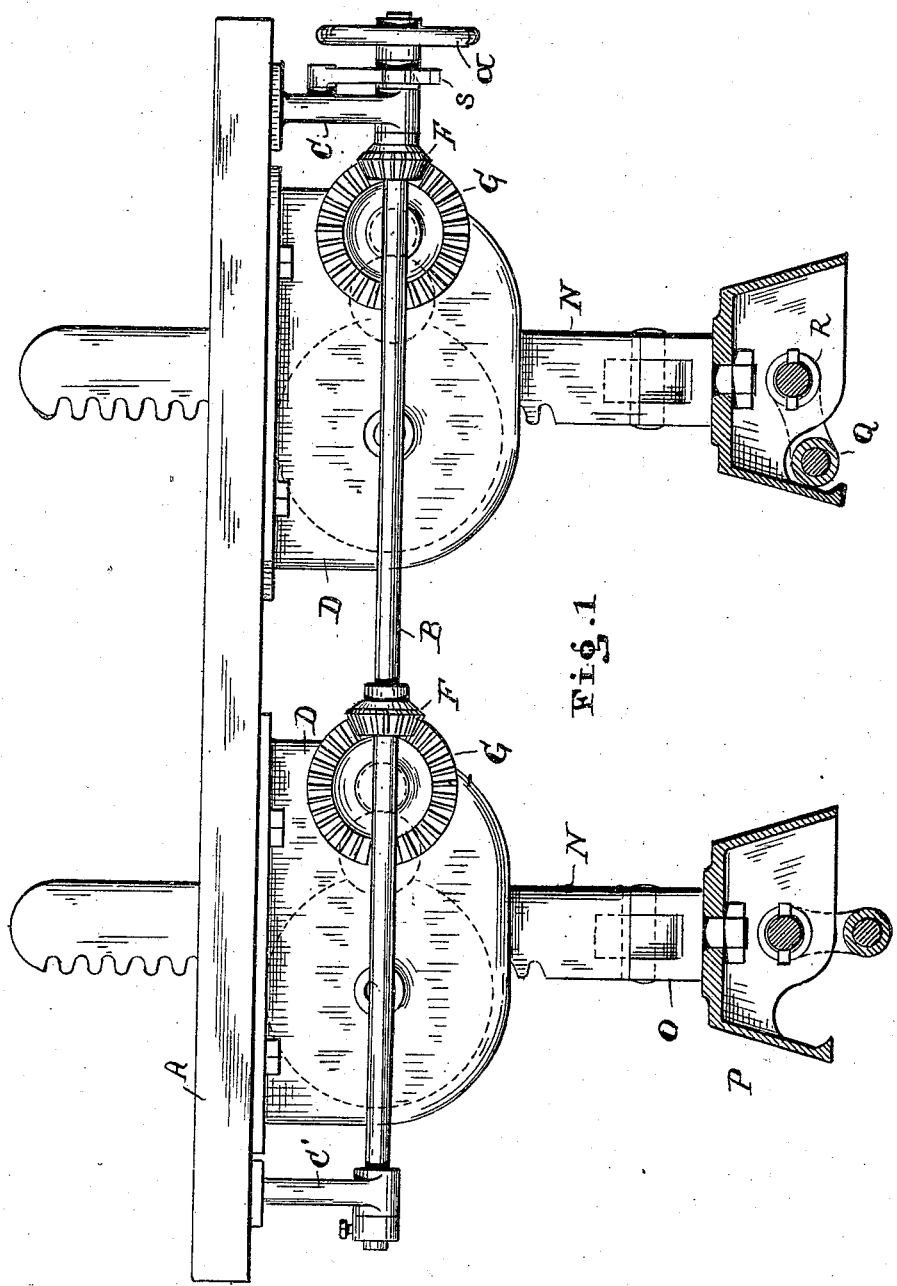
WITNESSES:
WM Gregory
W. H. Miller
INVENTOR
Louis Leyerle
BY B. F. Eibler
Atty

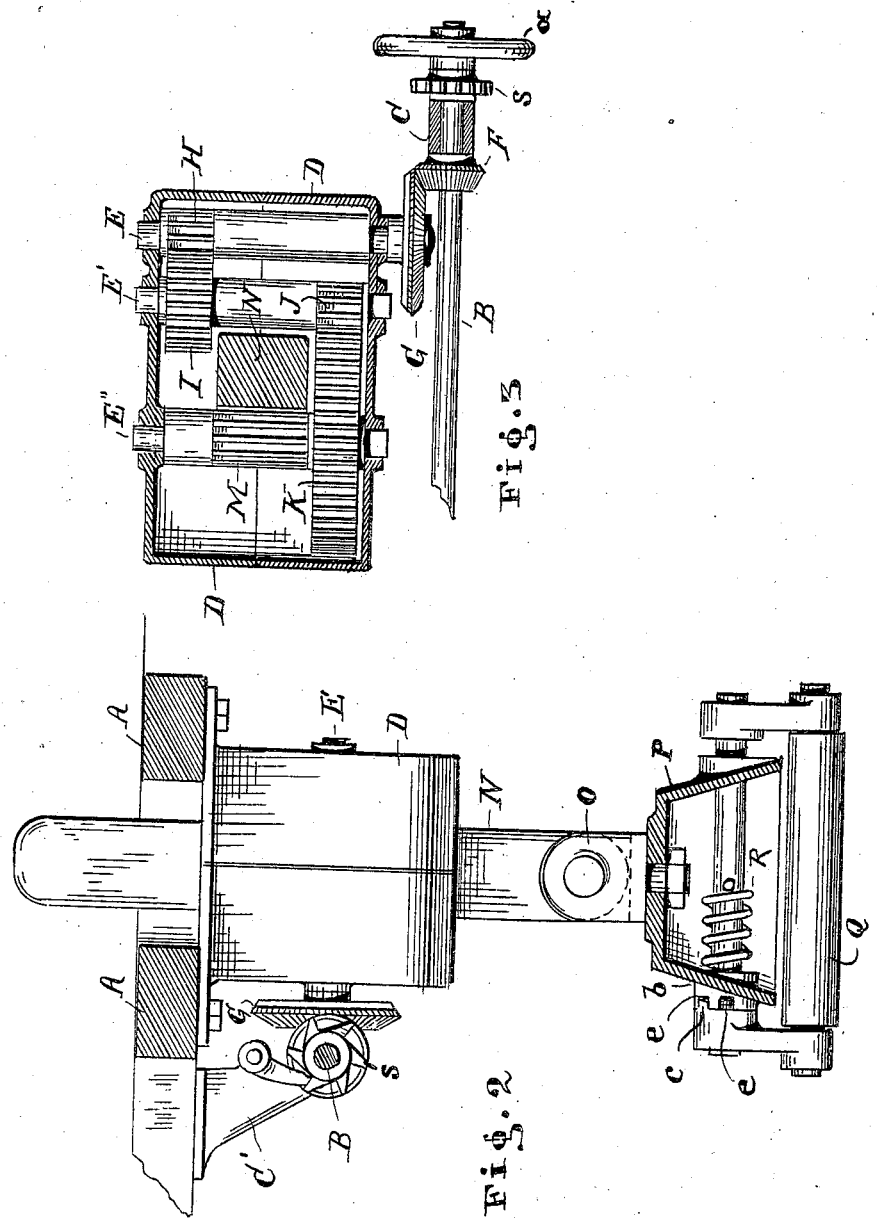

UNITED STATES PATENT OFFICE.

LOUIS LEYERLE, OF CLEVELAND, OHIO.

CAR LIFTING AND REPLACING DEVICE.

No. 877,099.         Specification of Letters Patent.         Patented Jan. 21, 1908.

Application filed August 20, 1906. Serial No. 331,257.

*To all whom it may concern:*

Be it known that I, LOUIS LEYERLE, a subject of the Emperor of Germany, residing at Cleveland, in the county of Cuyahoga and State of Ohio, have invented new and useful Improvements in Car Lifting and Replacing Devices, of which the following is a specification.

My invention relates to car lifting and replacing devices whereby cars can be bodily raised and whereby cars which become accidentally derailed can be moved and steered unto their track again.

The object of my invention is to provide readily applicable means for this purpose, which are quick acting, yet most powerful and easily manipulated. I attain this object in a device or devices constructed and arranged substantially as illustrated in the accompanying drawings in which Figure 1 represents a front elevational view of said device as attached to the beams of a car frame. Fig. 2 is an end view of the same and Fig. 3 is a partial horizontal sectional view of the same.

Like letters of reference denote like parts in the drawings and specification.

A distinctive feature of my invention is that this device is carried as a permanent fixture of the car, and is preferably applied at both ends of the car so that the same may be bodily lifted and shifted or rolled in proper place or position over the rails.

Especially if a person or persons should have accidentally been thrown under a car or the wheels thereof it is of vital importance that the weight of a car should be at once removed. With my device this can be done in the quickest possible time, and can be done without causing any further injury or mutilation to the person or persons pinned under a car, since the lifting of the car is done in direct perpendicular direction and no side movements of the car are caused or needed.

The device or devices are operated by a hand wheel $a$ or a crank handle and a combination of gearings hereinafter more fully described.

In Figs. 1 and 2 A A indicate beams of the car frame to which this device is secured in transverse position. The shaft B is the driving shaft, the same being journaled in the hangers C C' which are also suspended from the car frame.

Adjacent the shaft are securely arranged the brackets D D which carry the spindles E E' E''. Upon said shaft B and spindles E there are mounted the cone pinions F F and cone wheels G G. Opposite the wheels G is formed a pinion H integrally with the spindle or spindles E. This pinion H is in mesh with the gear I of spindles E' thence the pinion J upon the spindles E' engages the large wheel K of spindles E'' and last the pinion M upon said spindles E'' E'' engages the rack bar or bars N.

With comparatively little exertion upon the hand wheel $a$ a most powerful action is developed upon the pinions M and rack bars N for the purpose of lifting cars or replacing same upon the track when derailed.

The pinions H, J and M are formed integrally with their spindles simply for the sake of strength, safety and a compact structure.

The rack bars N may be guided in any suitable manner between the brackets D D. At the lower terminal thereof is a hinge O which has pivotal connection with the base P; furthermore there is a trundle Q arranged in hinged connection with said base. When a car needs to be simply raised then said trundle is in a position as shown to the right of Fig. 1. If a car becomes derailed however then the trundle is lowered as shown to the left of said Fig. 1, and when the bar or bars are adjusted then the whole weight of the car rests upon the trundles and the hinged and pivotal connections of the base admit of steering and rolling the car in proper position to the track or rails.

As shown in Fig. 2 the trundles are held under spring tension in whatever position they may be set. The spring R draws one of the trundle hangers against the notched bearing $b$ and holds the lug or pin $c$ in engagement with the notches $d$ or $e$ according to how the trundles are intended to be set. Furthermore a ratchet wheel $s$ is secured to the shaft B, and a pawl to the hanger C this provision being made to retain the car in any elevation it may be adjusted to, also to hold the bars in suspended position when not in use.

Obviously these devices are applicable with any kind of cars, street cars, interurban cars or steam cars without departing from the nature of my invention.

What I claim and desire to secure by Letters Patent is:

1. A car lifting and replacing device comprising the combination of a driving shaft extending transversely to the car frame, a series of spindles arranged in sets and journaled longitudinally with the car frame, gears and gear connections established with respect to and by said spindles and rack bars with bases each arranged in operative connection with one of the gear spindles substantially in the manner as and for the purpose set forth.

2. A car replacing device comprising the combination with the car frame of a driving shaft, a pair of lifts arranged in gear connection with said shaft and hinged bases with trundles attached to said lifts to enable steering of the suspended car as and for the purpose set forth.

3. The combination with the lifts of a car replacing device of trundles attached to the base of the rack bars thereof the said trundles having hinged connection with the base and the base having pivotal and hinged connection with the rack bar substantially as shown and for the purpose set forth.

4. A lifting device for cars comprising the combination of simultaneously operated rack bars provided with loosely connected bases the said rack bars being in gear connection with a driving shaft having cone pinions which engage cone wheels of spindles which indirectly drive said rack bars substantially in the manner as and for the purpose set forth.

LOUIS LEYERLE.

Witnesses:
  OTTO LEYERLE,
  B. F. EIBLER.